United States Patent [19]

Means et al.

[11] 4,073,712
[45] Feb. 14, 1978

[54] ELECTROSTATIC WATER TREATMENT

[75] Inventors: Eldon A. Means, Wichita, Kans.; Roy C. McMahon, Kansas City, Mo.

[73] Assignee: Electrostatic Equipment Company, Kansas City, Mo.

[21] Appl. No.: 743,139

[22] Filed: Nov. 19, 1976

[51] Int. Cl.$^2$ .............................................. B03C 5/00
[52] U.S. Cl. ................... 204/186; 204/149; 204/302
[58] Field of Search ................ 204/302, 186, 149

[56] References Cited

U.S. PATENT DOCUMENTS

| | | | |
|---|---|---|---|
| 1,183,753 | 5/1916 | Moody | 204/149 |
| 1,773,275 | 8/1930 | Neeley | 204/302 |
| 2,299,964 | 10/1942 | Crouch | 204/149 |
| 2,490,730 | 12/1949 | Dubilier | 204/305 |
| 2,939,830 | 6/1960 | Green et al. | 204/248 |
| 3,202,601 | 8/1965 | Green | 204/302 |
| 3,580,836 | 5/1971 | King | 204/308 |
| 3,585,122 | 6/1971 | King | 204/302 |
| 3,972,800 | 8/1976 | King | 204/302 |
| 4,012,310 | 5/1977 | Clark et al. | 204/305 |
| 4,024,047 | 5/1977 | Clark et al. | 204/302 |

FOREIGN PATENT DOCUMENTS

| | | |
|---|---|---|
| 451,690 | 9/1949 | Italy. |
| 601,576 | 5/1948 | United Kingdom. |
| 601,578 | 5/1948 | United Kingdom. |
| 601,479 | 5/1948 | United Kingdom. |
| 601,580 | 5/1948 | United Kingdom. |
| 652,967 | 5/1951 | United Kingdom. |
| 606,154 | 8/1948 | United Kingdom ................ 204/302 |

OTHER PUBLICATIONS

Industrial & Engineering Chemistry, vol. 46, No. 5, (1953), pp. 954–960.
Journal American Water Works Assoc., vol. 44, July 1952, pp. 577–582.
Fresh Water from the Ocean, Ellis (1954), pp. 40–43.

*Primary Examiner*—T. M. Tufariello
*Attorney, Agent, or Firm*—Fishburn, Gold & Litman

[57] ABSTRACT

A reliable and efficient device for the treatment of liquid system, to inhibit scale formation, subjects the liquid to an electrostatic field and includes a pair of concentric cylindrical electrodes mounted one within the other with a dielectrically isolated flow passage therebetween. The outer surface of the inner electrode and the inner surface of the outer electrode each have a layer of electrical insulation thereon to severely limit current flow to and from the liquid, and a circuit is provided for continually applying D.C. potential to the electrodes. Dielectric fluid fittings connect the device into a liquid system. The dimensions of the inner and outer electrodes and the thickness of the insulation thereon are determined, according to the parameters of the liquid system and the chemistry of the liquid, from a mathematical model of the treating device as the equivalent of three capacitors connected in series.

30 Claims, 7 Drawing Figures

ELECTRODE 2 AND SHELL 3 : ALUMINUM
ELECTRODE INSULATION 4 : TEFLON (K=2.1) 0.020" THICK
SHELL INSULATION 13 : $AL_2O_3$ (K=13) 0.005" THICK

ELECTRODE DIAMETER : 4.5"
ELECTRODE INSULATION 4 : TEFLON (K=2.1)
SHELL INSULATION 13 :
    $AL_2O_3$ (K=13) 0.005" THICK

ELECTRODE DIAMETER : 4.5"
ELECTRODE INSULATION THICKNESS : 0.020"
SHELL INSULATION 13 : $AL_2O_3$ (K=13) 0.005" THICK

ELECTROSTATIC WATER TREATMENT

The present invention relates to electrostatic treatment of fluid systems and more particularly to the construction and sizing of treating devices.

Apparatus for the treatment of moving liquid by causing electric current flow or discharge therein and/or impressing electrically induced fields thereacross have been known for many years, but the application of such devices to common industrial and domestic problems, such as water system scaling and clogging, has met with varying success. Some installations have appeared to be functional while others which seemed to be operating under generally similar circumstances obviously failed and no broadly accepted reasons for the different results have been advanced. Likewise, applicants are aware of no satisfactory mathematical model by which a reasonably accurate determination can be made for establishing the optimum type, size and characteristics of a treater to produce desired and reliable results in a particular environment.

In more recent years it has become appreciated that a large number of factors and complex interactions are apparently involed in the treating process. This seems logical since such liquid systems are themselves usually highly complex, including variations in dissolved salts, suspended solids, turbulence, pH, piping, electrical environment, temperature, pressure, etc. Heretofore, most attempts at explaining the operation of treaters in such systems presumed that the electrical field or current flow somehow affected only the carrier liquid and/or the dissolved ions therein.

The present invention results from the outgrowth of a theory and experimentation which sharply contrasts with the "liquid treatment" concept, and proposes, instead, that many liquid clogging mechanisms, including water system scaling, involve the electrostatic relations between suspended particles, the carrier liquid and the walls of the piping network. Thus, an electrostatic field suitably impressed across a section of flowing water is believed to primarily affect not only the water, but mainly suspended, especially colloidal size, particles immersed in the water. The effect of the field will depend, in large measure, upon the relationship of the natural electrostatic charge on such immersed particles to the electrostatic charge on the various surfaces of the treater and how the latter charge induces a response on the liquid contacting surfaces of the piping network. If relative conditions are proper, the particles will be urged by the field to remain in suspension or migrate toward a charged electrode isolated from the walls of the piping network, thus reducing the tendency to form flow restricting deposits. The reduction of colloid particles which are capable of acting as seeds for nucleation of scale building crystal formations results in reduced tendency for scale deposition.

The natural electrostatic charge on the immersed particles in the liquid, or more accurately, the overall charge effect of the various groups of particles normally associated in the same system, can be determined by known procedures, but the control of the electrostatic charge on critical treater surfaces is elusive and heretofore difficult to achieve.

As a basis for this invention, it has been empirically discovered that the electrostatic field between particular water treater surfaces, in large part, can be predicted and controlled by limiting certain parameters in treater construction and installation, especially the dielectric constant of the insulating material or materials in contact with the water, the efficiency of the insulating material or materials and seals in preventing charge leakage, and the physical size ratio of the treater parts which form the surfaces producing the electrostatic field across the water complex under treatment. The word "water", as used herein, means water complexes containing dissolved and suspended solids, etc., as are normally found in a great many industrial and domestic applications.

In the practice of this invention, the manipulation of electrical potentials, to produce relationships within certain parameters calculated from an equation which presents a mathematical model of the treater as three capacitors connected in series, results in operable treaters, while devices having relationships falling outside those parameters are apparently less-functional or only marginal in operation.

The principal objects of the present invention are: to provide operable and efficient electrostatic water treaters; to provide such treaters which function to predictably inhibit the formation of scale from colloidal particles immersed in flowing water; to provide a treater construction which substantially reduces the formation of scale in piping systems and may function to remove scale already formed; to provide a method of designing operable and efficient electrostatic treaters for particular installations; to provide a method of treating water to reliably inhibit the formation of certain clogging deposits in the piping system containing same; to provide a dependable alternative to many types of chemical water treatment; to provide such a treater which functions to more efficiently "kill" the tendency of spray booth paint particles to clog water curtain piping; and to provide such methods and apparatus which have wide application in improving desired properties of water for industrial and domestic purposes at minimal cost and maximum safety.

Other objects and advantages of this invention will become apparent from the following description taken in connection with the accompanying drawings constituting a part of this specification, wherein are set forth, by way of illustration and example, certain embodiments of this invention.

Figure 1:
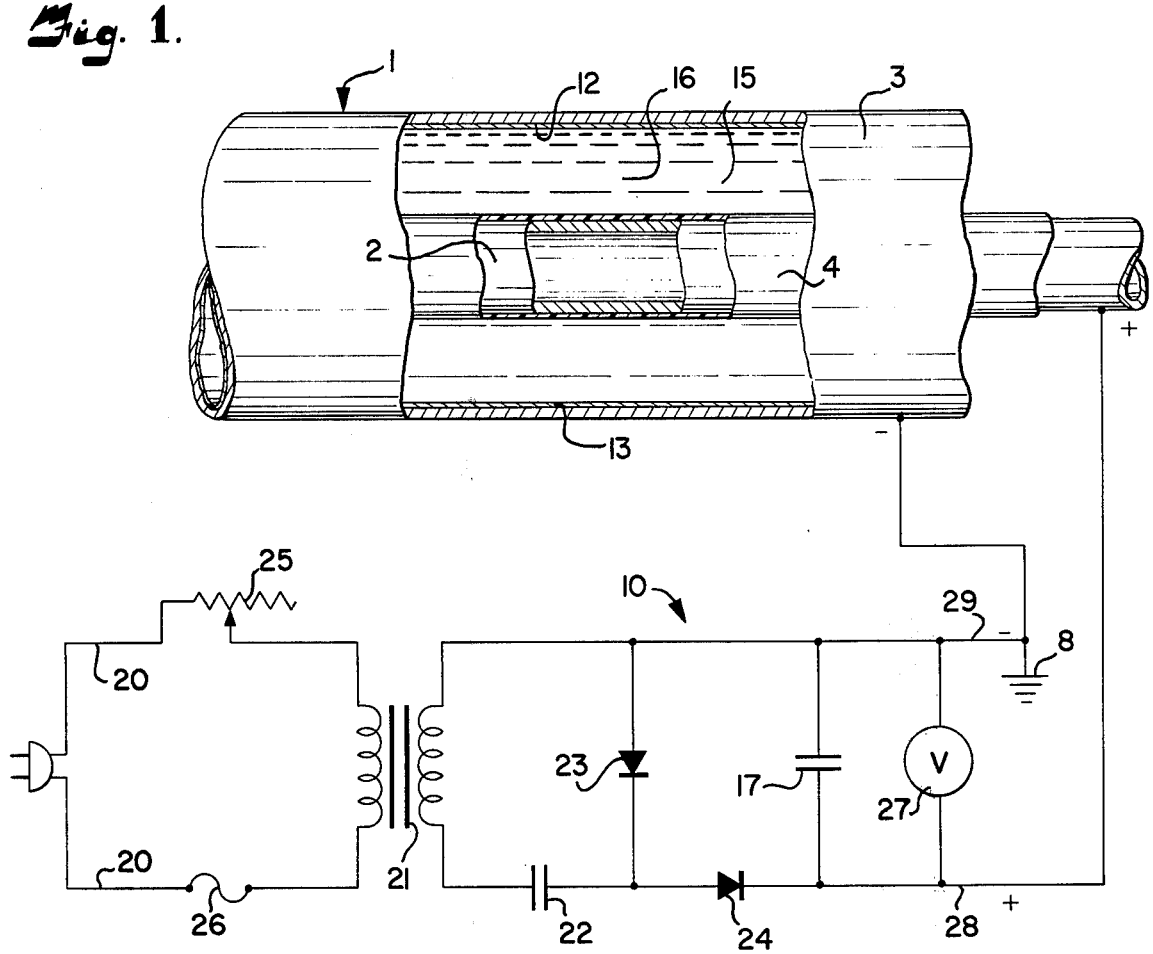
FIG. 1 is a fragmentary side elevational view of the water treater with portions broken away to illustrate the construction of components thereof and including a diagrammatic view of a power supply circuit connected to the water treater.
Figure 6:
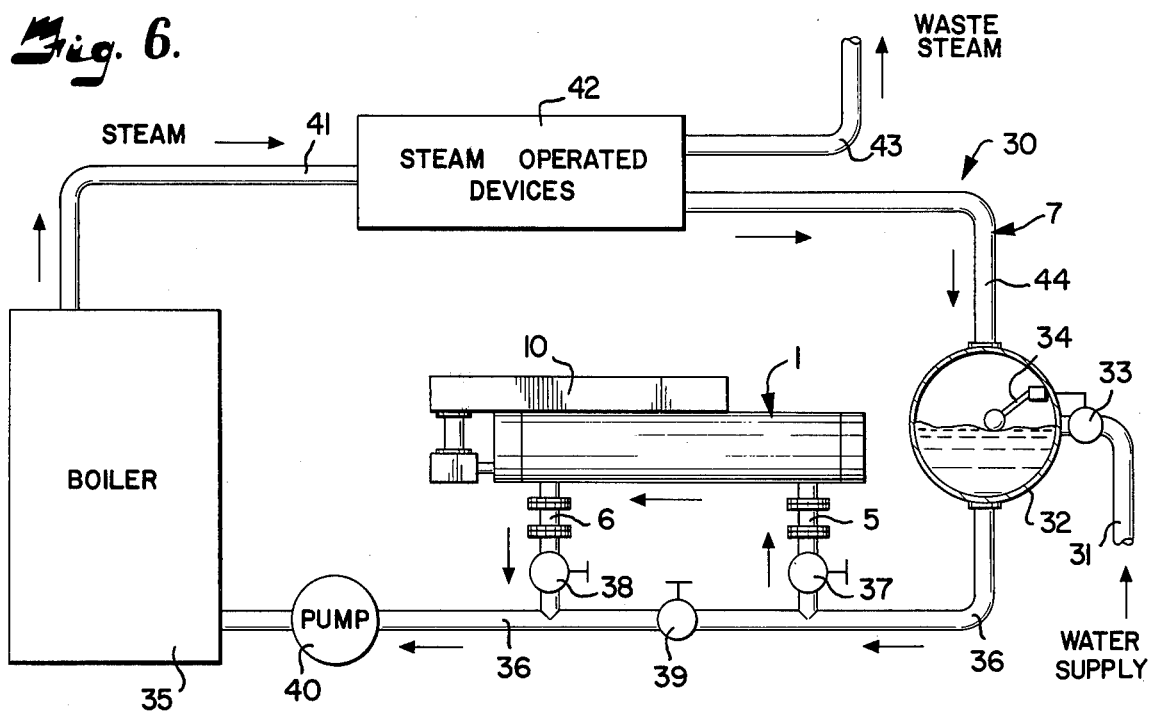
FIG. 6 is a diagrammatic view of the water treater in a boiler water supply system.

Referring to the drawings in more detail:

Applying this invention, by way of example, to a common treater configuration 1 and common water composition to be treated, concentric cylinders 2 and 3 are provided with the cylinder 2 (electrode) being insulated by a coating or sheath 4 of dielectric material, such as Teflon, certain epoxies, Mylar, hard anodized aluminum, certain ceramics or other like dielectric material, and impressed with a positive D.C. potential by a suitable circuit 10 described below, and forming the anode. The outer cylinder (shell) 3 is connected by dielectric fittings 5 and 6 into a piping system 7, as shown in FIG. 6, grounded at 8 (FIG. 1) and connected to the negative branch of the D.C. potential. The water composition is assumed to be of relatively neutral pH or above and, as a result of evaporation and/or loss of carbon dioxide, to contain colloidal size or nucleated particles of calcium carbonate as the predominate scale forming inclusion.

In the practice of this invention the inner surface 12 of the outer cylinder 3 is provided with a dielectric coating 13, similar to that noted above and sufficiently effective to substantially isolate the outer cylinder 3 from direct current flow from or to the water. The electrode 2, dielectric coating 4, shell 3, dielectric coating 13, and water 15 in the treater 1 are considered as the equivalent of three capacitors connected in series. The component capacitors are: $C_1$ comprising the dielectric coating or sheath 4, $C_2$ comprising the water 15 in the flow passage 16, and $C_3$ comprising the dielectric coating 13. The component capacitors $C_1$, $C_2$, and $C_3$ combine to form an equivalent capacitance $C_{eq}$ according to the series capacitance formula:

$$\frac{1}{C_{eq}} = \frac{1}{C_1} + \frac{1}{C_2} + \frac{1}{C_3} \quad (1)$$

The capacitance of each component capacitor is determined according to the cylindrical capacitance formula:

$$C = \frac{2\pi k \epsilon_o L}{\ln\left(\frac{b}{a}\right)} \quad (2)$$

wherein:
$k$ is the respective dielectric constant (for vacuum = 1),
$\epsilon_o$ is the permittivity of free space $$(8.854 \times 10^{-12} \frac{\text{farad}}{\text{meter}}),$$

$L$ is the length of the cylinders,
$a$ is the inner radius of the respective capacitor, and
$b$ is the outer radius of the respective capacitor.

Figure 2:
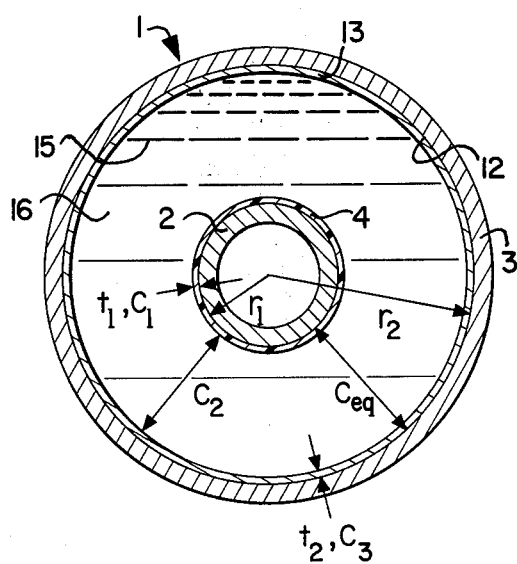
FIG. 2 is an enlarged transverse sectional view of the water treater.

With referece to FIG. 2, the treater 1 illustrated includes an electrode 2 having an outer radius $r_1$. The dielectric coating or sheath 4 has a thickness $t_1$. The outer electrode or shell 3 has an inner diameter $r_2$ and the dielectric coating 13 thereon has a thickness $t_2$. Therefore, for determining $C_1$, $b = r_1 + t_1$; $a = r_1$; for $C_2$, $b = r_2 - t_2$, $a = r_1 + t_1$; for $C_3$, $b = r_2$, $a = r_2 - t_2$.

Multiplying equation (1) by $VC_{eq}$, wherein V represents the output voltage of the power supply 10, derives the relationship:

$$V = V\left(\frac{C_{eq}}{C_1} + \frac{C_{eq}}{C_2} + \frac{C_{eq}}{C_3}\right) \quad (3)$$

wherein the terms of the polynomial in equation (3), $$\frac{C_{eq}}{C_1}, \frac{C_{eq}}{C_2}, \text{ and } \frac{C_{eq}}{C_3},$$

represent percentages of the applied voltage V appearing across the respective capacitors $C_1$, $C_2$, and $C_3$.

It has been found through experimentation that, generally, the higher the applied voltage V, the more effective is the treater 1 in preventing scale buildup. However, the increase of voltage above a certain level produces practical problems which are currently difficult to overcome. The physical size of the power supply capacitor 17 to provide sufficient capacitance for filtering the A.C. ripple from the applied voltage becomes impractical at higher voltages. Further, the limits of the dielectric strengths of the dielectric coatings 4 and 13 must be considered to avoid voltage breakdown of these materials.

For these reasons and since it is in the region of the flow passage 16 that the effect of the impressed voltage appears to be desired, it follows that a maximum practical voltage must be selected. It has been determined empirically that a maximum practical voltage is on the order of 3000 volts.

In the practice of this invention, selection of the size of the electrode 2 and shell 3, functional insulation of both from the flow passage, and selection of the thicknesses of the dielectric coatings 4 and 13 produce, in the correct relationship, a surprising increase in treater effectiveness. Optimum effectiveness for particular conditions appears to be predictable by reference to the mathematically derived voltage appearing across the water 15 in the flow passage 16.

Figure 3:
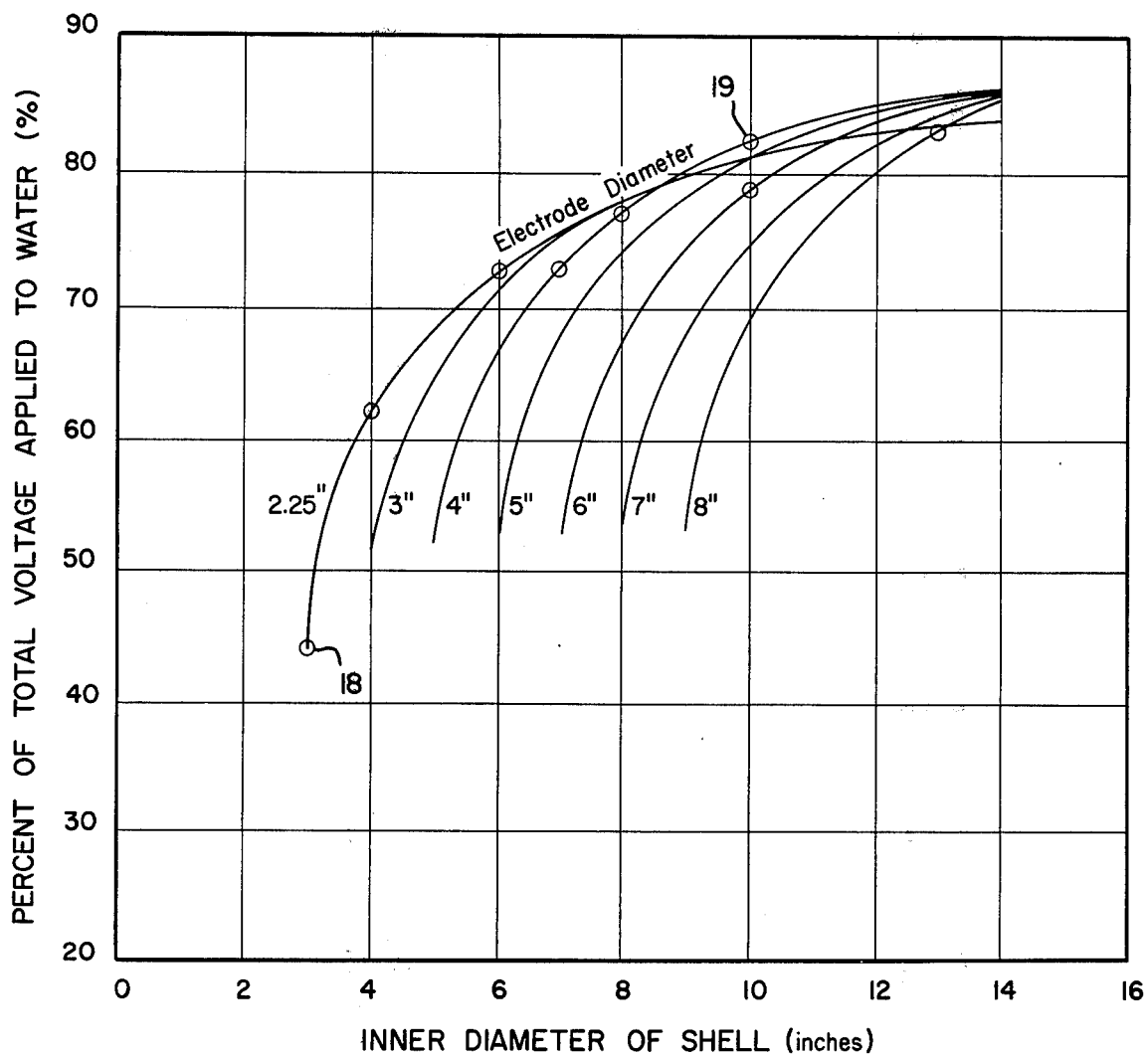
FIG. 3 is a graph showing the percentage of voltage appearing across the water in a treater versus the outer barrel size for various sized inner electrodes.
Figure 4:
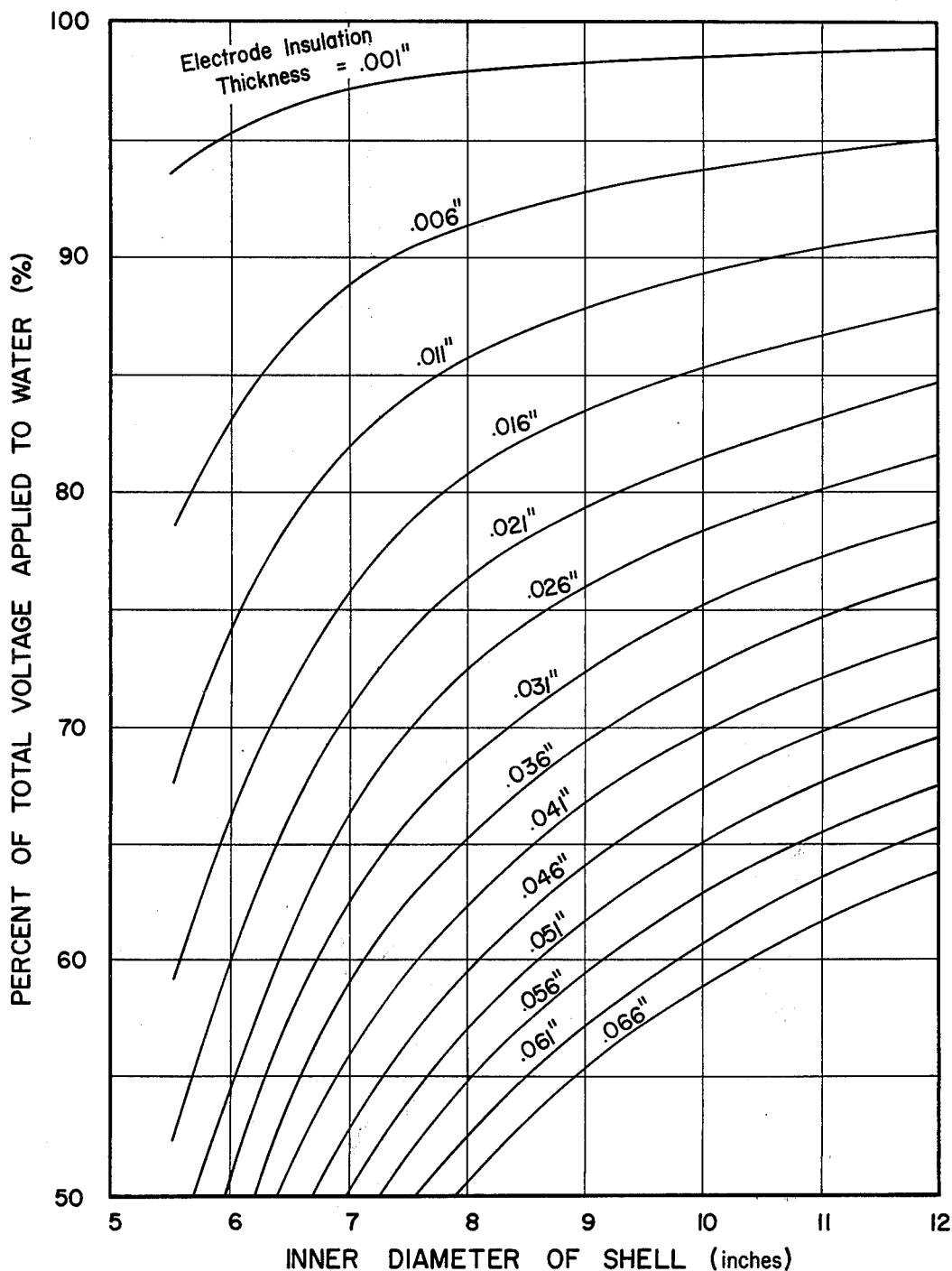
FIG. 4 is a graph showing the percentage of voltage appearing across the water in a treater versus the outer barrel size for various thicknesses of dielectric coating on the outer surface of a fixed sized inner electrode.
Figure 5:
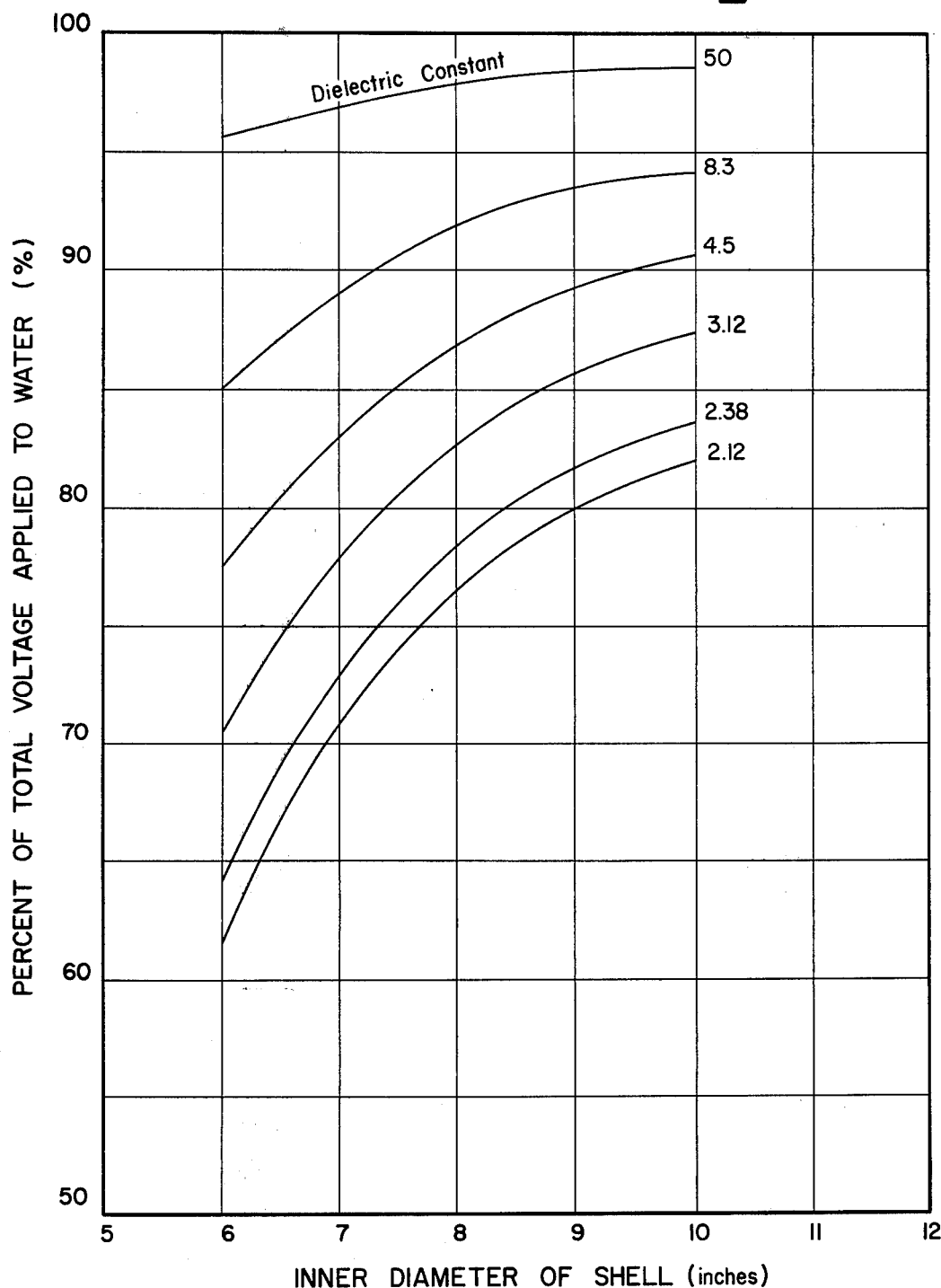
FIG. 5 is a graph showing the percentage of voltage appearing across the water in a treater versus the outer barrel size for a fixed thickness dielectric coating of various dielectric constants on the outer surface of a fixed sized inner electrode.

Thus, by substituting appropriate values in the equations (1), (2), and (3), data may be generated which may then be plotted, as shown in FIGS. 3, 4, and 5, to determine optimum parameters.

In FIG. 3, the percentage of voltage appearing across the water 15, or $C_2$, is plotted against the internal diameter of the shell 3 along curves of electrode 4 diameter. FIG. 3 includes data points representing sizes of working treaters whose performances have been observed and recorded. With reference to FIG. 3, the point 18 representing such a treater has an electrode diameter of 2.25 inches and a shell diameter of 3 inches. The percentage of applied voltage appearing across the water in the treater 18 is seen to be approximately 44%. The treater 19, however, has an electrode diameter of 4 inches, a shell inner diameter of 10 inches and, in contrast, about 83% of the applied voltage appears across the water. Thus, the performance of the treater 19 is predicted to be substantially better than the treater 18 and such predictions have been apparently confirmed by inspection of systems employing the treaters over a period of time.

For marginal treater performance, it has been determined that the physical parameters of a treater 1 must be such that at least fifty percent of the applied voltage appears across the water 15. It is, therefore, recommended that the percentage of voltage appearing across the water be greater than sixty-five percent (65%) for moderate efficiency and greater than seventy-five percent (75%) for high efficiency.

In a preferred form, the electrodes 2 and the outer shells 3 of the treaters are constructed of aluminum with the dielectric materials 4 on the electrodes 2 being a layer of Teflon as thin as practical to prevent insulation interruption, for example, five thousandths of an inch (0.005 inch) to twenty-five thousandths of an inch (0.025 inch). As discussed below, the thinner layers are operationally preferable. The dielectric constant of Teflon is approximately 2.1 and for water, around 81. The dielectric material 13 of the shell 3 is, in this example, a coating of hard anodized aluminum ($Al_2O_3$) having a thickness of approximately five thousandths of an inch (0.005 inch). The dielectric constant of hard anodized aluminum is about 13.

Referring to FIG. 4, the graph shows the percentage of voltage appearing across the water versus the shell inner diameter along curves of constant thickness of the electrode dielectric 4. The electrode 2 has a diameter of 4.5 inches. The dielectric material 4 is Teflon. The inner surface of the shell 3 is hard anodized, as in FIG. 3, to a thickness of 0.005 inches. The thickness of the dielectric 4 is varied from 0.066 inch to 0.001 inch in 0.005 inch increments. It can be summarized from FIG. 4 that as the thickness of the dielectric 4 is decreased, the percentage of voltage appearing across the water 15 is increased.

Referring to FIG. 5, the graph shows the effect of varying the dielectric constant of the electrode dielectric material 4. The diameter of the electrode 2 is 4.5 inches. The thickness of the dielectric material 4 thereon is 0.020 inch. The dielectric material 13 of the shell 3 is the same as in FIG. 4; hard anodizing 0.005 inch thick. The percentage of voltage across the water 15 is plotted for variations in shell inner diameter along curves of fixed dielectric constant of the electrode sheath 4. From FIG. 5 it may be concluded that increasing the dielectric constant of the dielectric covering 4 increases the percentage of voltage appearing across the water 15.

There are practical limitations to increasing the percentage of the applied voltage appearing across the water including physical size (FIG. 3) and, as noted above, the dielectric strength of the material 4 (here defined as the maximum voltage a dielectric material can withstand without breakdown, expressed as volts per unit of thickness). As the thickness of the dielectric material is reduced at a constant voltage, the limit of the dielectric strength is approached. In FIG. 5 the limitations to increasing the dielectric constant are the availability of dielectric materials having these characteristics and the relative difficulty in applying these materials to the surfaces of the electrodes.

In applying the treater 1 of the present invention to an existing fluid system, it is necessary to first know the required flow rate of the system which will determine the minimum cross-sectional area of the flow passage 16. It is desirable to use standard size components for constructing the electrode 2 and the shell 3 for economic reasons, while at the same time considering the performance projections of FIG. 3. The projected performance may then be adjusted by selecting suitable dielectric coverings 4 and 13 with consideration of data such as shown in FIGS. 4 and 5.

The power supply 10 for the treater 1 may consist of a conventional D.C. power circuit. Alternating current, received by the power conductors 20, is stepped up by a transformer 21. A capacitor 22 and diodes 23 and 24 comprise a voltage doubler, the output of which is pulsating direct current having a voltage twice the alternating current input. The capacitor 17 filters the pulsating direct current to provide relatively pure direct current for application to the treater 1.

It has been found that the capacitor 17 should be as large as practical, although the reason for this, if any other than reduction of ripple, is not well understood. Practical values for the capacitor 17, at the voltage levels employed, appear to range between about 0.5 mfd and 20 mfd, although larger values may be utilized. It appears that the combination of maximum practical voltage across the water and a relatively large capacitance of capacitor 17 produces the charge conditions at $C_2$ for optimum results. It is theorized that charge, in conjunction with the electrostatic field associated therewith, produces the repelling force to prevent particle deposition on the shell 3 and piping system 7, the water acting as both a dielectric and a conductor to transmit the desired conditions beyond the treater itself. It is noted that the production of a repelling force on the shell 3 has its counterpart in an attracting force on the electrode 2. However, the use of the Teflon sheath or other adhesive resistant material will minimize particle deposition thereon, and the colloidal particles, at least in part, eventually coalesce or otherwise change and form easily removable sludge rather than hard scale.

Preferably, the power supply circuit 10 includes a rheostate 25, a fuse 26, and a volt meter 27. The positive output terminal 28 is connected to the electrode 2 while the negative output terminal 29 is connected to the shell 3. It is necessary for the shell 3 to be connected to an effective earth ground 8 by a low resistance conductor, otherwise stray currents may enter into the treater system and adversely affect operation.

Since both electrode 2 and shell 3 are insulated, there is substantially no current drawn by the treater 1. Therefore, the treater 1 itself consumes no appreciable electrical power, rather, power consumed is primarily the losses that are incurred by the components of the power supply circuit 10.

FIG. 6 illustrates the application of the treater 1 to a boiler water supply and recycling system 30. The system 30 received water from a supply conduit 31 emptying into a reservoir 32 which receives and holds both a quantity of the supply water and water recovered from condensed steam. A valve 33 coupled with a reservoir level sensing device 34 allows replenishment of the reservoir 32 when the liquid therein recedes below a minimum level.

The treater 1 is connected in the system 30 between the reservoir 32 and the boiler 35. The treater 1 includes dielectric fittings 5 and 6 for connecting the treater 1 to the boiler supply conduit 36. The dielectric fittings 5 and 6 insulate the treater 1 from the rest of the system 30 and reduce the possibility of stray electrical currents affecting the performance thereof. Also included are an inlet valve 37 connected between the conduit 36 and the inlet fitting 5, and an outlet valve 38 between the outlet fitting 6 and the conduit 36. A bypass valve 39 is suitably placed in the conduit 36 between the connection of the valves 37 and 38 for non-treatment operation as desired and in the event that the treater 1 must be removed from the system 30.

A pump 40 is connected in the conduit 36 and is operative to propel water from the reservoir 32 to the boiler 35 where the water is converted to steam. A steam supply conduit 41 conducts steam from the boiler 35 to the steam operated devices 42 such as machinery, a generator turbine, heat exchangers, etc.

In some applications waste steam is produced which is represented as discharged through the conduit 43. The remainder of the steam is condensed and returned to the reservoir 32 via the conduit 44.

The treater 1 in operation substantially reduces the tendency of calcium carbonate in suspension to form deposits throughout the piping and boiler of the system 30. In the boiler 35 the calcium carbonate that does precipitate because of evaporation does so as a loose sludge which may be conveniently removed by blow-down or flushing.

Figure 7:
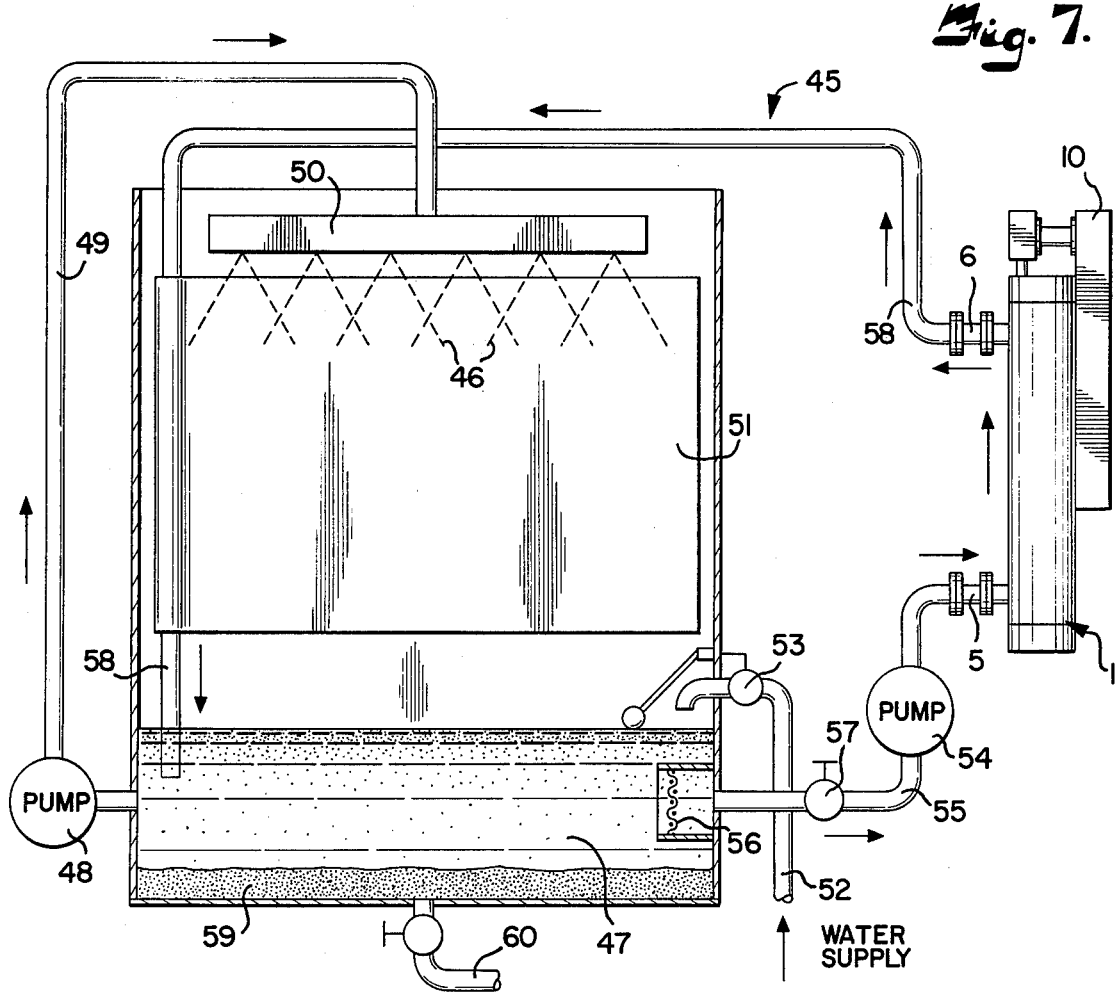
FIG. 7 is a diagrammatic view of the water treater in use with a paint spray booth for treating suspended paint particles in the water curtain supply and recycling system thereof.

Illustrated in FIG. 7 is a paint spray booth 45 which employs a spray or curtain of water for entrapping airborne paint particles. A system of air ducts and blowers (not shown) directs the paint particles into the flowing water 46 which washes the particles from the air into a sump 47 therebelow. Water in the sump 47 is propelled by a pump 48 through a conduit 49 back to the spray head 50 to be discharged and entrap more paint particles. In the spray booth 45 a plurality of flood sheets 51 may be employed to contain the water curtain 46. Water may be added to the sump 47 to make up for water evaporated or blown away by means of a supply conduit 52 in cooperation with a float valve 53.

Water to be treated by the treater 1 is directed by a pump 54 by way of a conduit 55 to the treater 1. A screen 56 may be employed to exclude any large paint globules or debris from the pump 54 and treater 1. Preferably, a valve 57 is included in the conduit 55 for selective operation of the treater 1. The dielectric fitting 5 connects the conduit 55 to the inlet of the treater 1, and the dielectric fitting 6 connects the outlet thereof to a water return conduit 58.

Without the treater 1 in the system 45, the particles of paint tend to coagulate into masses which clog the piping system and water spray head 50. Also, the particles tend to stick to the surfaces of the sump 47.

The treater 1 in operation in the spray booth water system inhibits the paint particles from sticking together and substantially reduces the tendency of the particles to stick to the internal surfaces of the piping system and the sump 47. When the water containing the paint particles has flowed through the treater 1 and has been redeposited in the sump 47, the paint particles float or settle into a sludge 59 of individual particles which is relatively easily removed by skimming off the surface or venting through a drain 60.

It is to be understood that while certain forms of the present invention have been illustrated and described, it is not to be limited thereto except insofar as such limitations are included in the following claims.

What is claimed and desired to be secured by Letters Patent is:

1. A device for treating a fluid with an electrostatic field comprising:
   (a) a pair of electrodes mounted in spaced relation;
   (b) means for directing a fluid between said electrodes;
   (c) said electrodes each having a respective dielectric covering insulating said electrodes from said fluid, said insulating covering on at least one of said electrodes being a hard anodized coating;
   (d) power supply means establishing a direct current potential between said electrodes, said power supply means having a positive terminal connected to one of said electrodes and a negative terminal connected to the other electrode; and
   (e) said electrodes, dielectric coverings and fluid forming the equivalent of three capacitors connected in series, said electrodes being spaced apart and sized and said dielectric coverings having thicknesses and dielectric constants whereby the percentage of said potential appearing across said fluid exceeds 50%.

2. The device as set forth in claim 1 wherein the percentage of said potential appearing across said fluid exceeds 65%.

3. The device as set forth in claim 1 wherein the percentage of said potential appearing across said fluid exceeds 75%.

4. The device as set forth in claim 1 wherein said other electrode is connected to an earth ground by a low resistance conductor.

5. The device as set forth in claim 1 wherein:
   (a) said one electrode is an elongated conductive cylinder having a respective dielectric covering on the external surface thereof;
   (b) said other electrode is an elongated, cylindrical conductive shell having a respective dielectric covering on the internal surfaces thereof;
   (c) said one electrode is mounted coaxially within said shell with an annular flow passage therebetween; and
   (d) said shell has dielectric fittings for fluid connection to a fluid system.

6. The device as set forth in claim 5 wherein:
   (a) said shell is formed of aluminum; and
   (b) said hard anodized coating is on the internal surfaces of said shell.

7. A device for electrostatically treating a fluid, said fluid having a dielectric constant $k_f$, said device comprising:
   (a) an elongated conductive cylinder having a radius $r_1$ and a length L;
   (b) said cylinder being covered by a dielectric material having a thickness $t_1$ and a dielectric constant $k_1$;
   (c) an elongated, cylindrical conductive shell having a length greater than L, an internal radius $r_2$, and having a fluid inlet and a fluid outlet;
   (d) said shell having the internal surfaces thereof covered with a dielectric material having a thickness $t_2$ and a dielectric constant $k_2$;
   (e) said cylinder being mounted coaxially within said shell with a flow passage therebetween; and
   (f) the values of $r_1$, $r_2$, L, $t_1$, $t_2$, $k_1$, and $k_2$ being such that in the relationship $$1 = \frac{C_{eq}}{C_1} + \frac{C_{eq}}{C_2} + \frac{C_{eq}}{C_3},$$

wherein:

$$C_1 = \frac{2\pi k_1 \epsilon_o L}{\ln\left(\frac{r_1 + t_1}{r_1}\right)}, \quad C_2 = \frac{2\pi k_f \epsilon_o L}{\ln\left(\frac{r_2 - t_2}{r_1 + t_1}\right)},$$

-continued
$$C_3 = \frac{2\pi k_2 \epsilon_o L}{\ln\left(\frac{r_2}{r_2 - t_2}\right)}, \quad \epsilon_o = 8.854 \times 10^{-12} \frac{\text{farad}}{\text{meter}},$$

$$C_{eq} = \frac{1}{\frac{1}{C_1} + \frac{1}{C_2} + \frac{1}{C_3}},$$

the term ($C_{eq}/C_2$) has a value greater than 0.5 and the dielectric material on at least one of said cylinder and shell is a hard anodized coating.

8. The device as set forth in claim 7 wherein the term ($C_{eq}/C_2$) has a value greater than 0.65.

9. The device as set forth in claim 7 wherein the term ($C_{eq}/C_2$) has a value greater than 0.75.

10. The device as set forth in claim 7 including power supply means for supplying a non-pulsating direct current voltage of a selected value, said power supply means having a positive terminal connected to said cylinder and a negative terminal connected to said shell.

11. The device as set forth in claim 7 wherein:
    (a) said shell is formed of aluminum; and
    (b) said hard anodized coating is on said shell.

12. The device as set forth in claim 7 wherein said shell is connected to an earth ground by a low resistance conductor.

13. In a device for electrostatic treatment of fluid in a fluid system, said device being of the type comprising a pair of electrodes mounted in spaced relation with a flow passage therebetween, one of said electrodes having a dielectric covering insulating said one electrode from said fluid, there being a direct current potential between said electrodes, said one electrode being electrically positive, the improvement comprising:
    (a) a respective dielectric covering on the other of said electrodes insulating said other electrode from said fluid; and
    (b) one of said dielectric coverings being a hard anodized coating;
    (c) said electrodes, said dielectric coverings, and said fluid forming the equivalent of three capacitors connected in series, said electrodes being sized and spaced apart and said dielectric coverings having thicknesses and dielectric constants whereby the percentage of said potential appearing across said fluid exceeds 50%.

14. The device as set forth in claim 13 wherein the percentage of said potential appearing across said fluid exceeds 65%.

15. The device as set forth in claim 13 wherein the percentage of said potential appearing across said fluid exceeds 75%.

16. The device as set forth in claim 13 wherein said other electrode is connected to an earth ground by a low resistance conductor.

17. The device as set forth in claim 13 wherein:
    (a) said one electrode is an elongated conductive cylinder with a respective dielectric covering on the external surface thereof;
    (b) said other electrode is an elongated, cylindrical conductive shell having a respective dielectric covering on the internal surface thereof, said shell having a fluid inlet and a fluid outlet; and
    (c) said one electrode is mounted coaxially within said shell.

18. The device as set forth in claim 17 including dielectric fittings cooperating with said fluid inlet and outlet for fluid connection of said device to said fluid system.

19. The device as set forth in claim 17 wherein:
    (a) said shell is formed of aluminum; and
    (b) said shell dielectric covering is said hard anodized coating.

20. A method of inhibiting colloidal particles in a fluid from adhering to the internal surfaces of a fluid system comprising:
    (a) establishing a direct current potential between a pair of electrodes wherein:
        (1) one electrode is a positive electrode and the other electrode is a negative electrode, said negative electrode being connected by a low resistance conductor to an earth ground,
        (2) each of said electrodes is covered by a respective dielectric material insulating said electrodes from said fluid, said dielectric material on at least one of said electrodes being a hard anodized coating,
        (3) said electrodes, said dielectric materials, and said fluid form the equivalent of three capacitors connected in series, and
        (4) said electrodes are sized and spaced apart and said dielectric materials have thicknesses and dielectric constants such that the percentage of said potential appearing across said fluid exceeds 50%; and
    (b) causing said fluid to flow between said electrodes.

21. The method as set forth in claim 20 wherein the percentage of said potential appearing across said fluid exceeds 65%.

22. The method as set forth in claim 20 wherein the percentage of said potential appearing across said fluid exceeds 75%.

23. The method as set forth in claim 20 wherein:
    (a) said one electrode is an elongated conductive cylinder with said respective dielectric material on the external surfaces thereof;
    (b) said other electrode is an elongated, cylindrical conductive shell having said respective dielectric material on the internal surface thereof; and
    (c) said one electrode is mounted coaxially within said shell.

24. The method as set forth in claim 23 wherein:
    (a) said shell is formed of aluminum; and
    (b) said shell dielectric material is said hard anodized coating.

25. A method of manufacturing a device for electrostatically treating a fluid having a dielectric constant $k_f$, said method comprising:
    (a) providing an elongated conductive cylinder having a radius $r_1$ and a length L;
    (b) covering said cylinder with a dielectric material having a thickness $t_1$ and a dielectric constant $k_1$;
    (c) providing an elongated, cylindrical conductive shell having a length greater than L, an internal radius $r_2$, and having a fluid inlet and a fluid outlet;
    (d) covering the internal surfaces of said shell with a dielectric material having a thickness $t_2$ and a dielectric constant $k_2$; at least one of said cylinder and shell dielectric material being a hard anodized coating;
    (e) mounting said cylinder coaxially within said shell with a flow passage between said cylinder and said shell; and
    (f) choosing the values of $r_1$, $r_2$, L, $t_1$, $k_1$, and $k_2$ such that in the relationship $$1 = \frac{C_{eq}}{C_1} + \frac{C_{eq}}{C_2} + \frac{C_{eq}}{C_3},$$

wherein:

$$C_1 = \frac{2\pi k_1 \epsilon_o L}{\ln\left(\frac{r_1 + t_1}{r_1}\right)}, \quad C_2 = \frac{2\pi k_f \epsilon_o L}{\ln\left(\frac{r_2 - t_2}{r_1 + t_1}\right)},$$

$$C_3 = \frac{2\pi k_2 \epsilon_o L}{\ln\left(\frac{r_2}{r_2 - t_2}\right)}, \quad \epsilon_o = 8.854 \times 10^{-12} \frac{\text{farad}}{\text{meter}},$$

and $$C_{eq} = \frac{1}{\frac{1}{C_1} + \frac{1}{C_2} + \frac{1}{C_3}},$$

the term ($C_{eq}/C_2$) has a value greater than 0.5.

26. The method as set forth in claim 25 wherein the term ($C_{eq}/C_2$) has a value greater than 0.65.

27. The method as set forth in claim 25 wherein the term ($C_{eq}/C_2$) has a value greater than 0.75.

28. The method as set forth in claim 25 including:
  (a) forming said shell of aluminum; and
  (b) covering the internal surface thereof with said hard anodized coating.

29. The method as set forth in claim 25 including providing a non-pulsating direct current power supply having a selected voltage output, said power supply having a positive terminal connected to said cylinder and a negative terminal connected to said shell.

30. The method as set forth in claim 25 including providing a low resistance conductor for connection of said shell to an earth ground.

* * * * *

UNITED STATES PATENT OFFICE
CERTIFICATE OF CORRECTION

Patent No. 4,073,712          Dated February 14, 1978

Inventor(s) Eldon A. Means and Roy C. McMahon

It is certified that error appears in the above-identified patent and that said Letters Patent are hereby corrected as shown below:

Column 3, line 62, delete "referece" and insert --reference--.

Column 10, line 67, after "$t_1$," (italicized) insert --$t_2$-- (italicized).

*Signed and Sealed this*

*Fourth* Day of *March 1980*

[SEAL]

*Attest:*

SIDNEY A. DIAMOND

*Attesting Officer*      *Commissioner of Patents and Trademarks*